United States Patent [19]

Eifert

[11] Patent Number: 4,988,178
[45] Date of Patent: Jan. 29, 1991

[54] OUTSIDE REAR-VIEW MIRROR FOR VEHICLES

[75] Inventor: Klaus Eifert, Stadtprozelten, Fed. Rep. of Germany

[73] Assignee: Hohe KG, Collenberg, Fed. Rep. of Germany

[21] Appl. No.: 360,104

[22] Filed: Jun. 1, 1989

[30] Foreign Application Priority Data

Jun. 1, 1988 [DE] Fed. Rep. of Germany ... 8807152[U]

[51] Int. Cl.$^5$ .............................................. G02B 7/18
[52] U.S. Cl. .................................. 350/631; 248/231.3; 248/475.1
[58] Field of Search ....................... 350/637, 632, 631; 248/475.1, 231.3

[56] References Cited

U.S. PATENT DOCUMENTS 4,822,157 4/1989 Stout .................................... 350/629

FOREIGN PATENT DOCUMENTS 2907433 9/1980 Fed. Rep. of Germany .
8209925 6/1982 Fed. Rep. of Germany .
3614927 11/1987 Fed. Rep. of Germany .
421078 12/1934 United Kingdom ............. 248/475.1

Primary Examiner—Jon W. Henry
Attorney, Agent, or Firm—Fleit, Jacobson, Cohn, Price, Holman & Stern

[57] ABSTRACT

Disclosed is an outside rear-view mirror for a truck or bus to the body of which a bar is mounted. A mirror housing is provided for holding a mirror glass which is mounted to the bar by two mounting devices. Each mounting device includes a profile formed from a base wall of the mirror housing proximate to one of the side walls of the mirror housing and an intermediate member to be inserted between the bar and a profile. Thereby, transfer of vibrations of the bar to the mirror glass is substantially reduced.

17 Claims, 2 Drawing Sheets

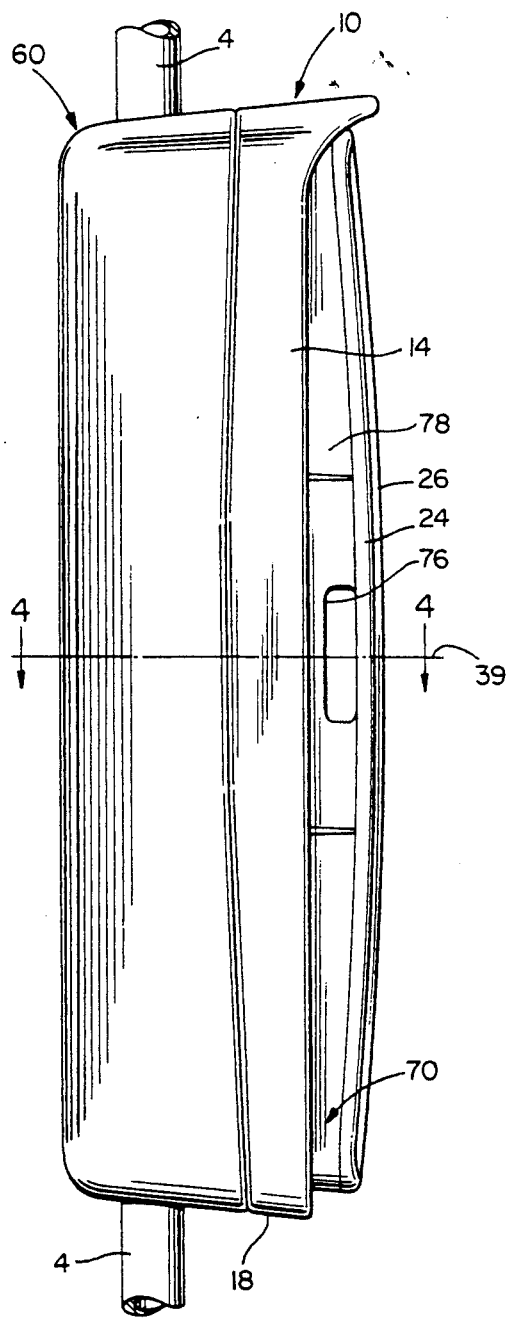
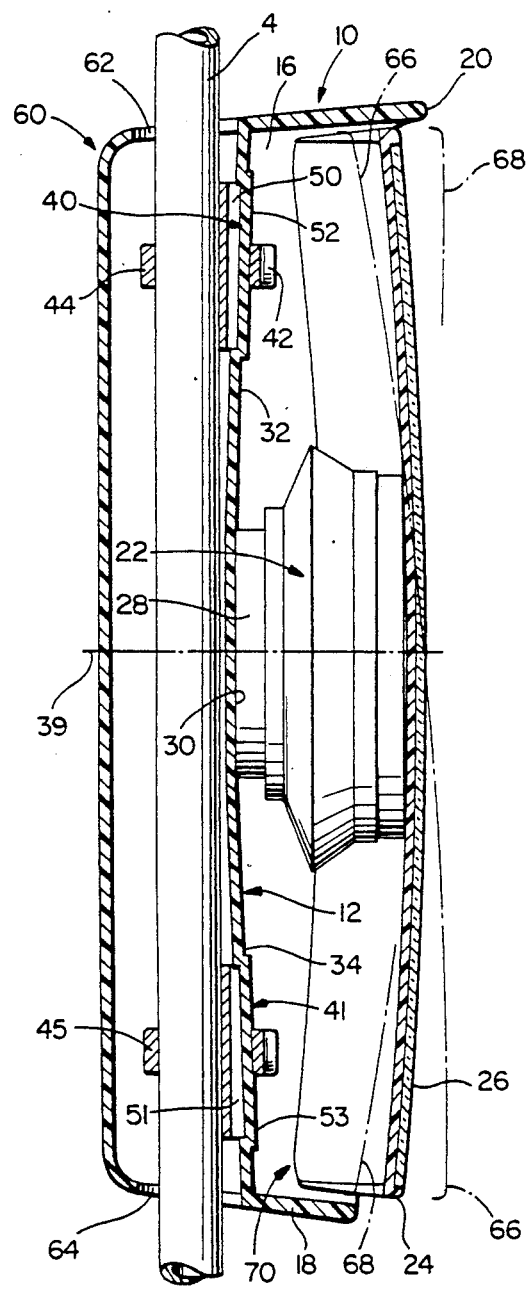
FIG. 1
FIG. 2

4,988,178

OUTSIDE REAR-VIEW MIRROR FOR VEHICLES

BACKGROUND OF THE INVENTION

1. Field of the Invention

The invention refers to an outside rear-view mirror for a vehicle, specifically for a truck or a bus, which has a mirror housing for holding a mirror glass. Usually, the mirror housing is mounted to a cranked bar which is fixed to the body of the car.

2. Description of related Art

German utility model specification G 87 16 105.2 (corresponding to U.S. patent application Ser. No. 07/279,811, now U.S. Pat. No. 4,909,619.) discloses an outside rear-view mirror for a truck or bus the mirror housing of which is mounted to a straight section of a bar by two straps and which may assume one of a plurality of angular positions about said straight section of the bar. Normally, the straight section of the bar extends substantially vertically when the bar is mounted foldably to the car body. Such type of mounting allows adapting the position of the mirror housing to different types of cars and to different mounting positions to the car body. Thereby, the central position of the mirror glass may be easily adjusted to the position of the driver of the car.

When running some types of cars conditions may arise which lead to vibrations of the bar. In the event the mirror housing of the known outside rear-view mirror is mounted to a section of the bar along which the vibrations are increased, such vibrations are transferred to the mirror glass without any damping to the effect that the driver will perceive only blurred pictures when viewing the mirror glass.

SUMMARY OF THE INVENTION

It is therefore an object of the invention to provide an improved outside rearview mirror the mirror glass of which will not be subjected to considerable vibrations when the mirror housing is mounted to the bar.

According to the invention, an outside rear-view mirror for a vehicle is provided which comprises a mirror housing and a mirror glass mounted within the mirror housing. The mirror housing is fastened to a bar fixed to the car body, by two mounting devices which are spaced along the bar and each of which is arranged proximate to one of two opposing side walls of the mirror housing. Thereby, a stable mount of the mirror housing to the bar is created which eliminates substantially the transfer of vibrations of the bar to the mirror housing because the mounting devices may be clamped to the bar at sections wherein the amplitude of the vibrations are a minimum. The bar may have a U-like shape the ends of which are fastened to the car body.

According to an embodiment of the invention, at least one intermediate member is provided, which may be mounted between one of the mounting devices and the bar upon assembly. This embodiment allows for maintaining a desired angular position of the mirror housing with respect to the bar. Particularly, three angular positions may be selected for the mirror housing relative to the bar so that the outside rear-view mirror may be utilized for a number of different types of cars without the need of any adapting modifications. The mirror glass, when assuming a middle position within its angular range of adjustment, remains adjusted to the seating position of an ordinary driver.

According to an improvement of the invention, both mounting devices are formed at the base of the mirror housing which is opposite to the mirror glass. Particularly, the base of the mirror housing may be provided with two oppositely inclined ramps each being proximate to one of the lateral walls of the mirror housing and each being a portion of the mounting devices. It is preferred to utilize two intermediate members which are preferably wedged-shaped each with a wedge angle corresponding to the inclination of the associated ramp relative to a central section of the base.

According to another improvement of the invention two pairs of mounting devices are provided which are arranged symmetrically relative to a plane extending parallel to the bar and transversly to the mirror glass. This embodiment of the invention allows mounting of the outside rear-view mirror to the bar at two positions of different distance to the body of the car. Thus, the outer position of the mirror housing may have five centimeters more distance to the car body than the inner position. The outer position of the mirror housing is particularly suitable for trucks, the load space thereof overhangs the driver's cab. The invention allows utilizing of an unmodified mirror housing also for such cases without individually adapted bars, so that the invention may be utilized for small trucks and broad trucks as well.

According to the invention, the mirror glass is mounted within the mirror housing such that it may be adjusted by the driver to his actual seating position while the mirror housing remains fixedly mounted to the bar by the mounting devices. In this structure a situation may occur, according to which the mirror glass is angularly displaced with respect to the mirror housing to a substantial extend, so that the rim of a lateral wall of the mirror housing may impede the driver of a complete view unto the mirror glass. In order to present to the driver an unrestricted view unto the total reflecting area of the mirror glass, an improvement of the invention provides for a mount of the mirror glass within the mirror housing such that the mirror glass is held ahead of the lateral and the lower rims of the mirror housing walls. Specifically, a backing plate upon which the mirror glass is commonly adhered is provided with a skirt at the edges thereof which extends to the interior of the mirror housing. This embodiment of the invention prevents dust and water form entry into the mirror housing through the space otherwise left between the backing plate and the rims of the mirror housing walls.

BRIEF DESCRIPTION OF THE DRAWINGS

A presently preferred embodiment of the invention is disclosed in the attached drawings which are explained hereafter in detail. From the drawings show FIG. 1 a lateral view of a mirror housing of an outside rear-view mirror which is clamped to a straight section of a bar;

FIG. 2 is a vertical section through the outside rear-view mirror according to FIG. 1;

DESCRIPTION OF THE PREFERRED EMBODIMENT

Figure 5:
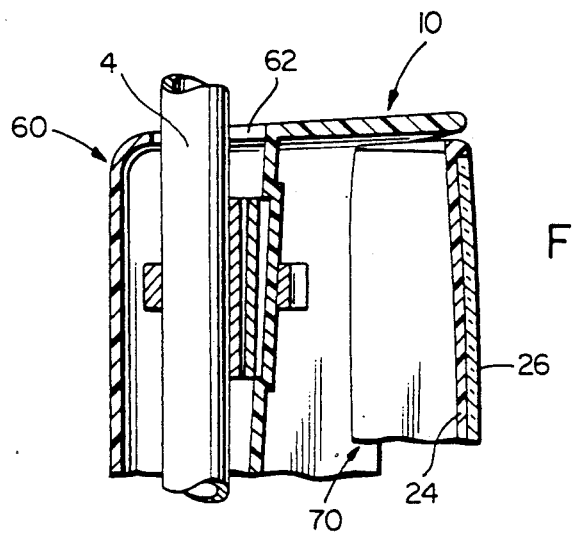
FIG. 5 a portion of the vertical section through the mirror housing according to FIG. 2 in an enlarged scale.

The outside rear-view mirror as explained hereinafter is preferably suitable being mounted through a bar to the left or right door of the driver's cab or to the car body of a truck or bus.

The mirror housing 10 formed from one piece of hard plastic material comprises a substantially rectangular base 12 from the edges of which two opposing side walls 14, 16, a lower wall 18 and an upper wall 20 project. A bearing cup 22 is mounted to an intermediate section of the base 12, which is adapted to hold a convex backing plate 24 and accomodating not shown electric or mechanical drive means for adjusting a convex mirror glass 26 bonded to the outer surface of the backing plate 24. The drive means may be activated by corresponding manipulations of the driver in his cab.

The base 12 comprises a flat central section 30 surrounding a foot 28 of the bearing cup 22 and extending parallel to a plane with respect to which the mirror glass 26 assumes a substantially symmetrical position when it is adjusted to a central angle within its range of angular adjustment. The central section 30 of base 12 continues into a substantially flat upper section in form of an upper ramp 32 of the base 12 which is inclined towards mirror glass 26 relative to the central section 30. The central section 30 continues into a substantially flat lower section formed as lower ramp 34 of base 12 which is inclined oppositely relative to the upper ramp 32 relative to the central section 30.

An upper mounting profile 40 of a mounting device is formed proximate to the upper wall 20 at the ramp 32 which allows for mounting the mirror housing 10 to a bar 4. Thus, the upper mounting profile 40 comprises two horizontally spaced bushes 42, extending into the interior of the mirror housing 10 and each having an inner thread. The bushes 42 allow for mounting a strap 44 by screws 44, 48 which grips the bar 4 opposite to the mounting profile 40 for mounting. An upper intermediate member 50 is inserted between the bar 4 and the upper mounting profile 40 where the strap 44 is fastened.

The intermediate member 50 has the form of a wedge, the thickness of which decreases when going downwardly along the bar 4. The intermediate member 50 abuts a shallow recess 52 of the upper mounting profile 40 on one hand and abuts a peripheral section of the bar 4 proximate to the mounting profile 40, by the concave outer surface thereof. The wedge angle of the upper intermediate member 40 equals the angle of inclination of the ramp 42 relative to the central section 30. Thereby a surface abutment of the upper intermediate member 50 to the tube-like bar 4 and to the recess 52 is obtained.

In case the bar 4 has rectangular or square cross section, the strap 44 and the upper intermediate member 50 similarly are provided with rectangular abutment surfaces for being adapted to the form of the cross section of bar 4.

A lower mounting profile 41 of the mirror housing 10 is provided proximate to the lower wall 18 at the lower ramp 34. The lower mounting profile 41 is substantially similar to the upper mounting profile 40 and is formed symmetrically to the horizontal center plane 39 of the outside rear-view mirror. Thus, the lower mounting profile 41 includes two bushes for mounting a lower strap 45 gripping the outer periphery of the bar 4 opposite to the base 12, and a lower wedge-shape intermediate member 51 decreasing in thickness when running upwardly along the bar 4 and having a wedge angle which corresponds to the inclination of the lower ramp 34 relative to the central section 30. The lower intermediate member 51 may be inserted between the bar 4 and ramp 34 for abutment to a shallow recess 53 formed in the ramp 34 and to the periphery of the bar 4 proximate to base 12.

Bar 4 as shown herein is a straight tube having cranked ends for forming a mounting bow the ends of which may be fastened to the body of a car.

A protecting cap 60 is screwed outwardly to base 12 which covers the outer portions of base 12 and bar 4 together with both mounting profiles 40, 41 of the mirror housing 10. To this end, the cap has two alligned openings 62, 64 for passage of bar 4. According to FIGS. 3 and 5 the openings 62, 64 are sufficiently large for allowing to mount the mirror housing 10 in any one of three angularly displaced positions to the bar 4.

A first angular position of the mirror housing 10 relative to bar 4 is shown in FIGS. 1 and 2. Therein, the central section 30 extends substantially parallel to bar 4 and the upper intermediate member 50 is inserted between upper mounting profile 40 of the mirror housing 10 and the lower intermediate member 51 is inserted with the lower mounting profile 41 of mirror housing 10 as illustrated in the drawings.

A second angular position of the mirror housing relative to bar 4 is obtained in case the upper intermediate member 50 and the lower intermediate member 51 are inserted one behind the other with the upper mounting profile 40 (FIG. 5). The lower ramp 34 of mirror housing 10 then abuts the bar 4, and the mirror housing therefore assumes a downwardly tilted position. For obtaining a third angular position of the mirror housing relative to bar 4, the upper intermediate member 50 and the lower intermediate member 51 may be inserted one behind the other with the lower mounting profile 41 of mirror housing 10. Thus, the upper ramp 32 abuts bar 4. In such case, the mirror housing assumes an upwardly tilted position relative to bar 4.

The mentioned angular positions of the mirror housing 10 relative to bar 4 each define a basic position of the mirror glass when it assumes a central position of its range of adjustment. For adapting the position of the mirror glass 26 to the individual seating position of a driver, it is known to adjust the position of the mirror glass 26 electrically or mechanically within an angular range which is illustrated in FIG. 2 by two dashpoint lines 66 and 68.

In case the mirror glass 26 is tilted towards the line 68, the rim of the mirror housing which normally projects beyond the mirror glass may cover a lower portion of the mirror glass and limits therefor the area of the mirror glass 26 to be viewed upon by the driver. A similar limitation may be encountered by the lateral rims of the walls of the mirror housing 10 in case the mirror glass 26 is tilted laterally to a substantial extend.

Figure 4:
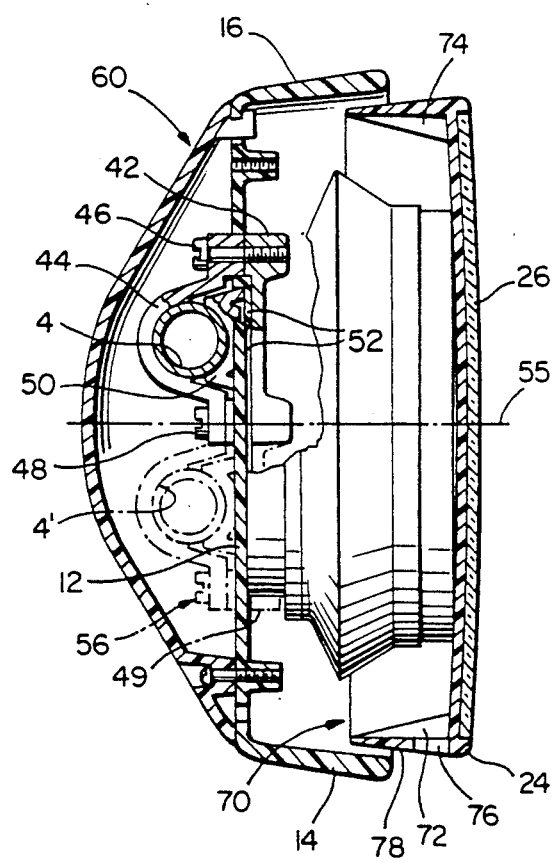
FIG. 4 a horizontal section through the mirror housing along line A—A of FIG. 1 wherein portions of a bearing cup are removed and portions of the mounting device are shown in section.

In order to remove this defficiency, the lateral walls 14, 16 and the lower wall 18 are shortened according to FIGS. 1, 2 and 4 such that the mirror glass 26 is held outwardly of the mirror housing 10. Thereby, a space would be left between the rim of the backing plate 24 and the rim of the mirror housing 10 through which water, dust, humidity could find a way into the interior of the mirror housing thereby contaminating the drive mechanism for adjustment of the mirror glass 26. For obviating the possibility of such contamination, the backing plate 24 is provided with a skirt 70 along the edge thereof which extends close to the lateral walls of the mirror housing 10 into the interior thereof. The skirt 70 may be strengthened by ribs 72, 74 (FIG. 4) formed therefrom. Thereby, the backing plate 24 is formed as a cage which opens into the interior of the mirror housing and surrounds the bearing cup 22 and the drive mechanism.

A slot 76 is cut into a section 78 of skirt 70 through which a tool may be inserted for manipulating a clamping ring by which the mirror glass 26 together with backing plate 24 may be mounted to the bearing cup according to German Patent Specification 29 07 433.

Figure 3:
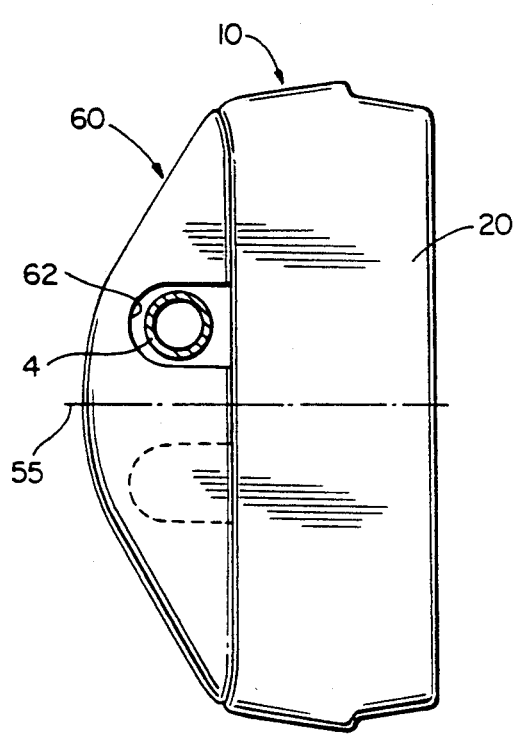
FIG. 3 a plan view of the outside outside rear-view mirror according to FIG. 1.

As may be seen particularly from FIG. 4 the mounting profiles are laterally offset with respect to a center plane 55 extending transversely to the mirror glass 26 and parallel to bar 4. Thus, a center hole is bored through base wall 12 through which screw 48 may extend into an internally threaded bushing for mounting strap 44. Another bore may be formed in base plate 12 laterally offset to the center plane 55 towards side wall 16 of the mirror housing 10 through which screw 46 may extend for penetrating into the internally threaded bushing 42 for mounting strap 44 on the other side of bar 4. Similar openings are provided in base plate 12 for the lower mounting profile not shown in FIG. 4. The opening 62 within cap 60 is similarly laterally offset with respect to plane 55 for allowing the bar 4 to extend threrethrough as shown in FIG. 3.

Another bore is formed in base plate 12 symmetrically opposite with respect to center plane 55 to the bore for screw 46 in order to allow forming of a symmetrical mounting profile 56 which is symmetrically offset towards side wall 14 of the mirror housing opposite to side wall 16. Such symmetrically offset mounting profile 56 is indicated in FIG. 4 by dashpoint lines. To this end each of the recesses 52, 53 may extend transversly to center plane 55 from one of the mounting profiles 40, 41 to the symmetrically offset upper mounting profile 56 and the not shown corresponding lower profile, respectively. Bushing 42 may then extend as indicated at 49.

The mirror housing 10 may be mounted to bar 4 by an upper mounting profile and a lower mounting profile either in the position offset relative to center plane 55 towards side wall 16 or oppositely offset towards side wall 14. As bar 4 is fixedly mounted to the body of the car and maintains its position both mounting types of the mirror housing to the bar result in two different positions of the mirror housing with respect to the car body. Both positions may deviate from each other by approximately five centimeters of distance to the car body. While FIG. 3 shows the cap 60 in a condition adapted for mounting the mirror housing 10 to the bar as shown in FIG. 4 in straight lines the cap 60 may be turned upside down to the effect that outcut 62 and the alligned outcut 64 of the cap extend symmetrically on the other side of center plane 55 as indicated in dashlines in FIG. 3. The bar 4 the alternate position thereof with respect to mirror housing 10 being indicated in FIG. 4 by numeral 4' then may extend again through outcuts 62, 64. Thereby, the position of the mirror housing 10 relative to bar 4 may be adapted to trucks of different load space.

From FIG. 4 it may also be seen, that the bushings for receiving screws 46, 48 may be formed from both ends of a locking bar.

What is claimed is:

1. Outside rear-view mirror comprising
a mirror housing for holding a mirror glass, and
a mounting apparatus for mounting the mirror housing to a bar fixed to a car body, the mounting apparatus including two mounting devices formed in the mirror housing and spaced along the bar, each mounting device being formed proximate to one of two opposing lateral walls of the mirror housing,
at least one of the mounting devices including at least one intermediate member inserted between the bar and the mirror housing,
each mounting device including a mounting profile formed from a base wall of the mirror housing for receiving said at least one intermediate member.

2. Outside rear-view mirror according to claim 1, wherein each mounting profile comprises a ramp, the ramps of the mounting-profiles having similar but opposite inclinations.

3. Outside rear-view mirror according to claim 2, wherein at least one intermediate member is provided for being inserted between one of the mounting profiles and the bar for mounting the mirror housing to the bar, the intermediate member having wedge-like form and a wedge angle which corresponds to the inclination of the ramp.

4. Outside rear-view mirror according to claim 3, wherein each of the mounting profiles includes a shallow recess for receiving an intermediate member.

5. Outside rear-view mirror according to claim 1, wherein the intermediate member has a contour of the periphery congruent with the bar proximate to the mirror housing.

6. Outside rear-view mirror according to claim 1, wherein a first pair of mounting profiles is provided offset towards one of the side walls of the mirror housing with respect to a center plane transverse to the mirror glass and parallel to the bar, and a second pair of mounting profiles is provided, which is symmetrically offset with respect to the center plane towards the opposite side wall of the mirror housing.

7. Outside rear-view mirror according to claim 6, wherein each mounting profile of each pair comprises a shallow recess formed in a base wall of the mirror housing.

8. Outside rear-view mirror according to claim 6, wherein each pair of mounting profiles includes an upper mounting profile and a lower mounting profile and wherein both upper mounting profiles comprise an upper shallow recess and the lower mounting profiles comprise a lower shallow recess, both recesses extending transversely to the center plane.

9. Outside rear-view mirror according to claim 1, wherein the mirror glass is bonded to a backing plate and is held in front of the rims of the side walls of the mirror housing and wherein the backing plate is provided with a skirt along the edge thereof which extends to the interior of the mirror housing.

10. Outside rear-view mirror according to claim 9, wherein a slot is formed in the skirt allowing insert of a tool for clamping and unclamping the backing plate from a bearing cup provided within the mirror housing for holding the backng plate.

11. Outside rear-view mirror according to claim 1 wherein a protecting cap is releasably mounted to the mirror housing for covering the mounting devices.

12. Outside rear view mirror comprising a mirror housing for holding a mirror glass, a mounting apparatus for mounting the mirror housing to a bar fixed to a car body, the mounting apparatus including two mounting devices formed in the mirror housing and spaced along the bar, each mounting device being formed proximate to one of two opposing lateral walls of the mirror housing, each mounting device including a mounting profile formed from a base wall of the mirror housing, and each mounting profile including a ramp, the ramps of the mounting profiles having similar but opposite inclinations.

13. Outside rear-view mirror according to claim 12, wherein at least one intermediate member is provided for being inserted between one of the mounting profiles and the bar for mounting the mirror housing to the bar, the intermediate member having a wedge-like form and a wedge angle which corresponds to the inclination of the ramp.

14. Outside rear-view mirror according to claim 13, wherein each of the mounting profiles includes a shallow recess for receiving an intermediate member.

15. Outside rear-view mirror comprising a mirror housing for holding a mirror glass, a mounting apparatus for mounting the mirror housing to a bar fixed to a car body, the mounting apparatus including two mounting devices formed in the mirror housing and spaced along the bar, each mounting device being formed proximate to one of two opposing lateral walls of the mirror housing, a first pair of mounting profiles being provided offset towards one of the side walls of the mirror housing with respect to a center plane transverse to the mirror glass and parallel to the bar, and a second pair of mounting profiles is provided, which are symmetrically offset with respect to the center plane towards the opposite side wall of the mirror housing.

16. Outside rear view mirror according to claim 15, wherein each mounting profile of each pair comprises a shallow recess formed in the base wall of the mirror housing.

17. Outside rear-view mirror according to claim 15, wherein each pair of mounting profiles includes an upper mounting profile and a lower mounting profile and wherein both upper mounting profiles comprise an upper shallow recess and the lower mounting profiles comprise a lower shallow recess, both recesses extending transversely to the center plane.

* * * * *